June 21, 1932. E. M. COLE 1,864,122
GUANO DISTRIBUTING ATTACHMENT FOR TRACTOR CULTIVATORS
Filed Dec. 7, 1928 4 Sheets-Sheet 1
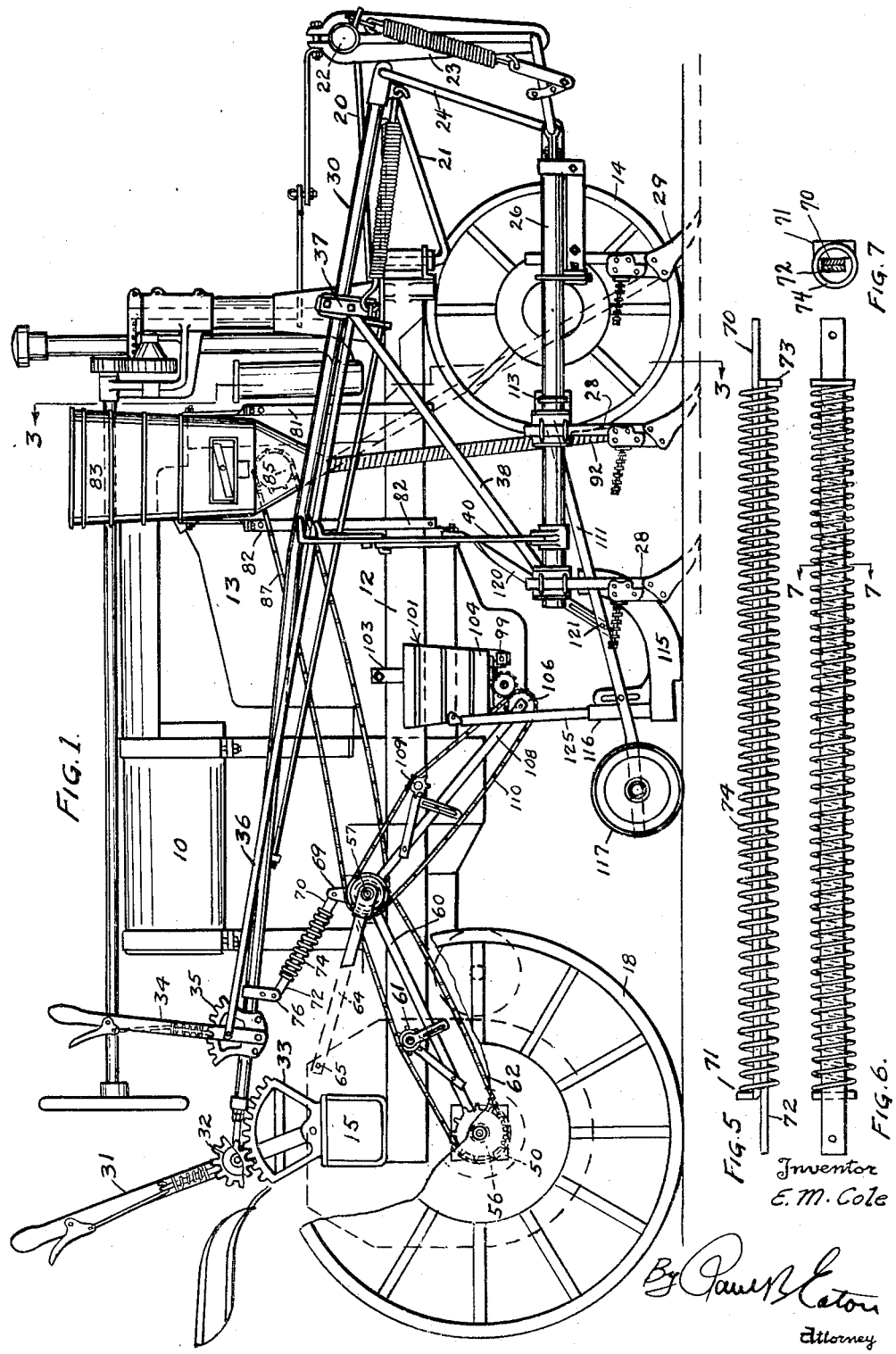
Inventor
E. M. Cole

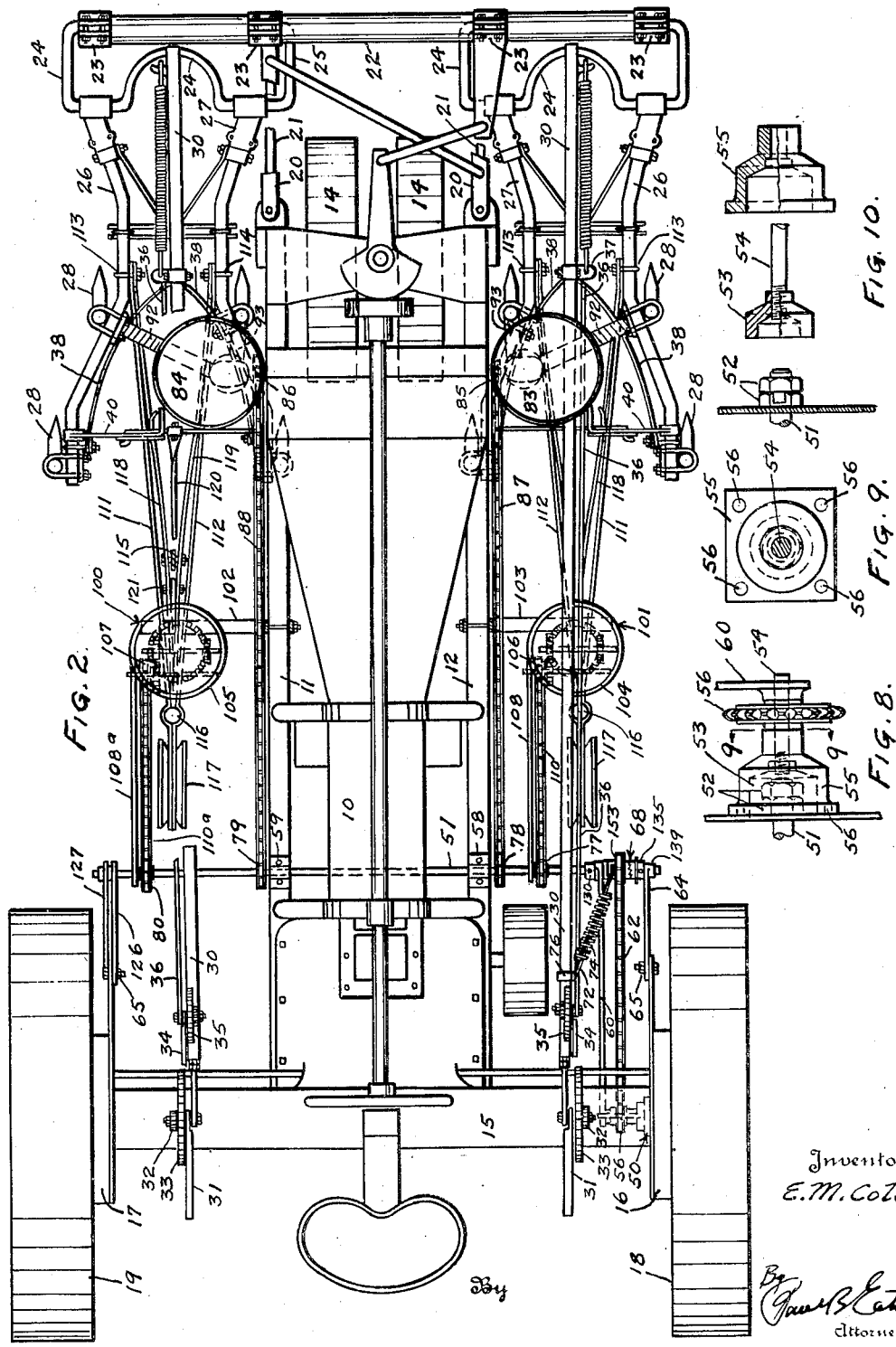

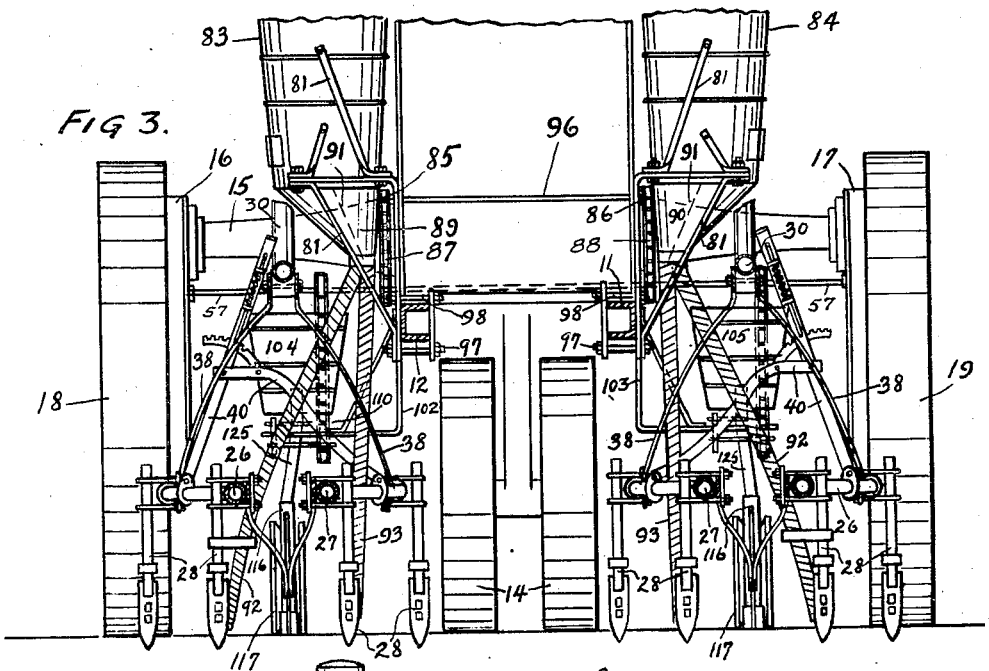

June 21, 1932. E. M. COLE 1,864,122
GUANO DISTRIBUTING ATTACHMENT FOR TRACTOR CULTIVATORS
Filed Dec. 7, 1928 4 Sheets-Sheet 4
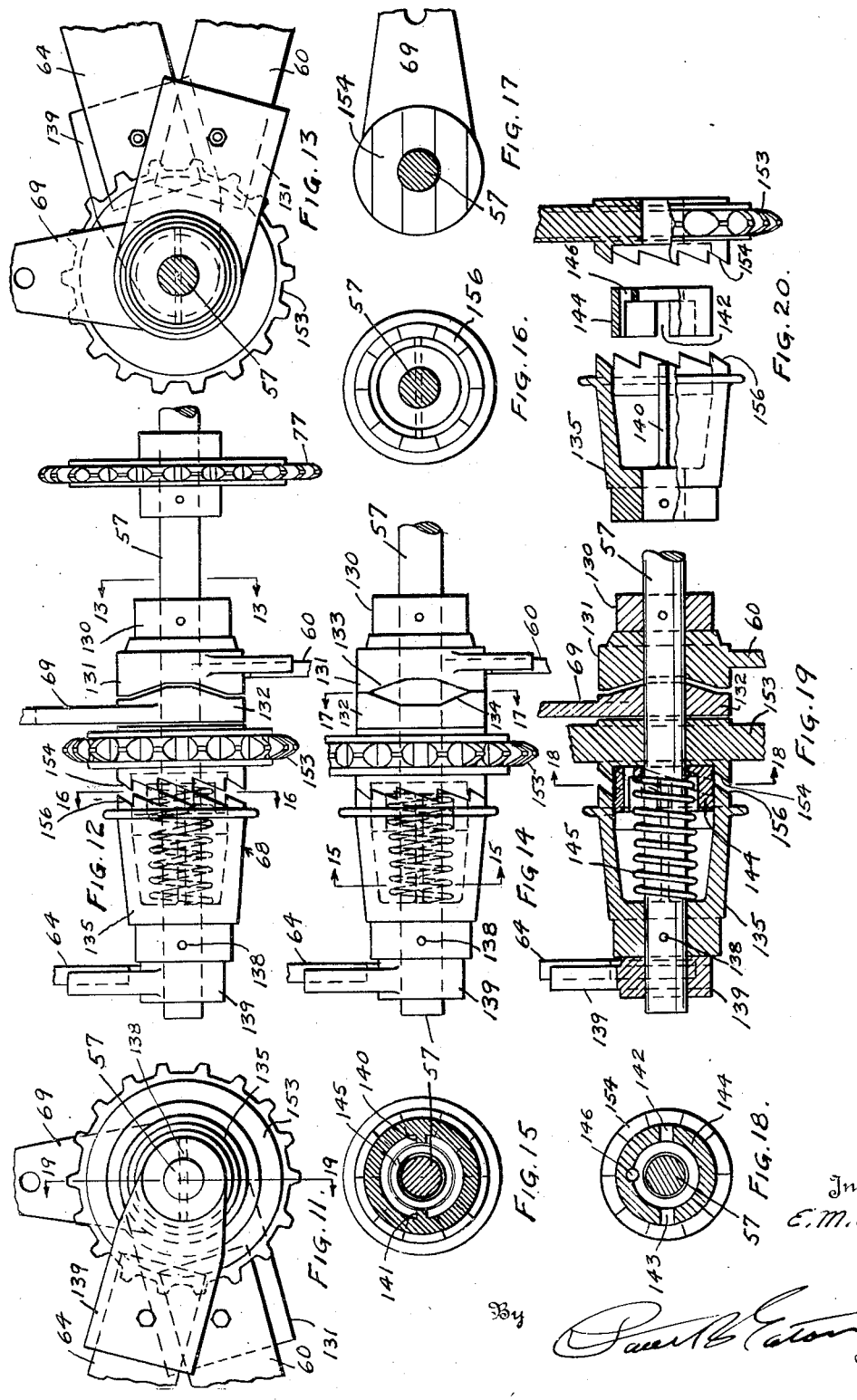

Patented June 21, 1932

1,864,122

UNITED STATES PATENT OFFICE

EUGENE M. COLE, OF CHARLOTTE, NORTH CAROLINA

GUANO DISTRIBUTING ATTACHMENT FOR TRACTOR CULTIVATORS

Application filed December 7, 1928. Serial No. 324,406.

This invention relates to a tractor having a combination of elements coacting therewith, and relates more especially to a tractor equipped with cultivator attachments, guano distributing means adapted to distribute guano to certain of the cultivating members and also to additional seed distributing means or planting means associated with the tractor and the cultivator attachments for distributing guano or planting seeds at the same time the cultivator attachments are used.

An object of my invention is to provide a tractor with special power take-off means, said power take-off being adapted to drive a transversely disposed shaft and said transversely disposed shaft being adapted to drive guano distributing means for placing guano in close proximity to certain cultivator members and placing seeds in a furrow after the ground has been stirred by the cultivator members.

Another object of my invention is to provide in combination with a tractor, cultivator attachments secured on each side of the tractor with a guano distributor located on each side of the tractor and being adapted to deliver guano behind certain of the cultivator members together with a seed distributor mounted behind the cultivator members and being adapted to place guano in a furrow, both the seed and guano distributors being adapted to be driven by a special power take-off connected to one of the rear wheels of the tractor.

In the drawings I have shown a tractor equipped with cultivator members on either side thereof, with a guano distributor mounted on each side of the tractor, and with a seed planting mechanism mounted on each side of the tractor and disposed to the rear of the cultivator members and being attached to the cultivator members and also, with spouts leading from the upper guano distributors to certain of the cultivator members for side dressing, together with power take-off means from one of the rear wheels suitably connected to drive both guano distributors and both seed planting devices, and when it is desired to use guano distributors I can dispense with the use of the seed planting means by disconnecting the belts driving the seed planting means, and when it is desired to use the seed planting means I can dispense with the use of the guano distributors by disconnecting the belts driving the guano distributors.

Some of the objects of my invention having been stated, other objects will appear as the description proceeds, when taken in connection with the accompanying drawings, in which—

Figure 1 is a side elevation of a tractor equipped with my guano distributors and planting means;

Figure 2 is a plan view of my arrangement;

Figure 3 is a view taken along the line 3—3 in Figure 1;

Figure 4 is a rear elevation;

Figure 5 is an enlarged detailed view of the means for operating the clutch;

Figure 6 is a view of Figure 5, looking from another direction;

Figure 7 is a cross-sectional view through Figure 6 taken along the line 7—7;

Figure 8 is a front elevation of my power take-off means;

Figure 9 is a cross-sectional view taken along the line 9—9 in Figure 8;

Figure 10 is an exploded view of a portion of Figure 8;

Figure 11 is an end elevation of the clutch and associated parts;

Figure 12 is a side elevation of the clutch and a portion of the driving shaft;

Figure 13 is a view of the other end of the clutch from that shown in Figure 11;

Figure 14 is a view similar to Figure 12 but showing the clutch in engaged position;

Figure 15 is a cross-sectional view through Figure 14, taken along the line 15—15;

Figure 16 is a view taken along the line 16—16 in Figure 12;

Figure 17 is a view taken along the line 17—17 in Figure 14;

Figure 18 is a view taken along the line 18—18 in Figure 19;

Figure 19 is a longitudinal cross-sectional view taken through the clutch;

Figure 20 is an exploded view of the central portion of Figure 19.

Referring more particularly to the drawings, the numeral 10 indicates a tractor which has the side bars 11 and 12 which support a suitable motor 13 and beneath the front end of the side bars 11 and 12 the front wheels 14 are mounted and the rear ends of the side bars are supported by the rear axle housing 15 which supports the housings 16 and 17 for the rear wheels 18 and 19. To the front end of the tractor are pivotally connected the members 20 and 21 which are pivotally connected to the cross bar 22 which has the downwardly projecting members 23 in the lower ends of which are mounted the crank arms 24 and on these crank arms are mounted cultivator beams 26 and 27 which have the cultivator members 28 thereon with the middle plow 29 secured in central position to open a furrow. The longitudinal rods 30 have their front ends secured to the crank arms 24 and project rearwardly where they are resiliently connected to a lever 31, which by means of the rotating pawl 32 and ratchet 33, all secured on the rear axle housing 15, can be moved longitudinally to lift and lower the cultivator members. The lever 34 is pivotally secured on the ratchet 35 mounted on the rod 30 and the rod 36 projects forwardly and is pivotally connected to the swinging member 37 to which the members 38 are connected, which members 38 are connected to the rear end of the cultivator beams 26 and 27, and the lever arrangement 40 is provided for regulating the distance of the cultivator beams from each other.

All of the previously described parts are conventional and are not a part of my invention, and it is this structure that I have shown my invention used in combination therewith, though I desire it to be understood that my invention is capable of being used with other cultivator attachments for tractors.

To the rear wheel 18 I secure the power take-off means 50, which power take-off means can be secured to either one of the rear wheels. These rear wheels have the axle 51 which has the nuts 52 secured on the ends thereof with a suitable housing covering this end of the axle and I remove the conventional housing, and, in lieu thereof, insert the member 53 over the nuts which member 53 has the shaft 54 secured thereto, and this shaft 54 projects through my new housing 55 and has the sprocket wheel 56 secured thereon. The housing 55 is secured to the rear axle housings by any suitable means such as bolts penetrating the holes 56 in the special housing and threadably engaging the rear axle housing.

Transversely disposed is the rotatable shaft 57 which is mounted in the bearings 58 and 59 on the side bars 11 and 12, which shaft is also rotatably mounted in the upper end of the brace 60 which has its lower end loosely secured to the shaft 54 to allow shaft 54 to rotate with relation to brace 60, and on this bar 60 is the tightener sprocket 61, and a sprocket chain 62 is mounted on the sprocket wheel 56 and the sprocket wheel 153 in the clutch mechanism. On the end of the shaft 57 and located on the other side of the clutch mechanism is the bar 64 which is connected to a portion of the rear axle housing as at 65, which bar 64 forms a bearing and support for the end of the shaft 57. This clutch mechanism is indicated broadly by the reference numeral 68 and has the arm 69 extending upward therefrom to which is pivotally connected the bar 70, which has its end 71 turned outward, and mounted alongside of this bar 70 is the bar 72 which has its end 73 turned outward and the compression spring 74 is mounted between the ends 71 an 73 so as to make a resilient connection between the arm 69 and the rod 30, as the cuff 76 is secured on this rod 30 and the upper end of the bar 72 is pivotally connected to this cuff.

This transversely disposed shaft 57 has the sprockets 77, 78, 79 and 80 mounted thereon for driving certain mechanism for distributing guano or driving the seeding means of planters as will be presently described.

On the side of the tractor I secure the braces 81 and 82 which support the guano distributors 83 and 84 which have the conventional guano distributing means in the bottom thereof, driven by the sprockets 85 and 86 and a sprocket chain 87 is mounted on the sprocket 85 and the sprocket 78 for driving the guano distributor 83, and the sprocket chain 88 is mounted on the sprockets 86 and 79 for driving the guano distributor 84. These guano distributors have the sloping spout portions 89 and 90, and in each of these there is a partition 91, shown in dotted lines in Figure 3 which divides the guano and directs the same into the two spouts 92 and 93, which spouts are connected to certain of the cultivator members 28 and are connected in the positions shown when a side dressing application of guano is desired to be applied, and when it is desired to use them for other purposes these spouts may be placed behind the central cultivating member 29 when this central cultivating member is attached to my device, but for cultivating purposes this central cultivating member 29, of course, would be removed. The braces 81 and 82 which hold the guano distributors are secured to each other by the bolt 96 at their top portions and the bolts 97 and 98 at their lower portions, secure the braces 81 and 82 to the side bars 11 and 12.

I have also provided means for attaching planting means to each side of the tractor behind the cultivator members. These are designated broadly by the reference numerals 100 and 101 and are secured to the side bars 11 and 12 by means of the braces 102 and 103 and on these braces the seed holding hoppers 104 and 105 are mounted, and the feeding mechanism of these hoppers is of conventional design and is adapted to be driven by means of the sprockets 106 and 107 and the brace 108 runs from the shaft on which sprocket 106 is mounted up to and around the shaft 57 and supports a tightener mechanism 109 thereon and the sprocket chain 110 is mounted on the sprockets 106 and 77. The brace 108a runs from the shaft 57 to the shaft on which the sprocket 107 is mounted and the sprocket chain 110a is mounted on the sprockets 107 and 80. The planting means 100 and 101 are identical in structure and comprise the elongated bars 111 and 112 which are secured to the cultivator beams 26 and 27 as at 113 and 114 and project rearwardly and support the furrow openers 115 and also the spout 116 and the covering wheel 117 and the additional members 118 and 119 are also secured to the cultivator beams as at 113 and 114 and project rearwardly and have secured between their rear ends the front portion of the furrow opener 115 and have their rear ends secured to the members 111 and 112, and the brace 120 has its lower end slotted, and works on a pin 121 which penetrates the members 118 and 119 and this brace 120 projects upwardly and is connected to the lever mechanism 40 which regulates the spread of the cultivator beams 26 and 27.

The seed planters 100 and 101 have the downwardly projecting spouts 125, each of which fits into a spout 116 so as to allow the vertical movements of the spout 116 with relation to the spout 125 due to the rise and fall of the furrow opener 115 and the wheel 117.

It has before been stated that the braces 60 and 64 support one end of the shaft 57. The braces 126 and 127 support the other end of the shaft and the brace 108a runs from this end of the shaft down to the planter mechanism and the sprocket chain 110a is mounted on the sprocket 80 and the sprocket 106 of the seed distributing mechanism.

If I desire to use only the seed planters, I can remove the cultivator members 28 and leave the cultivator members 29 to act as a furrow opener and thus I can plant two rows at a time. If I desire to use the guano distributors only for side dressing, then I can remove the seed hoppers or disconnect them from the drive shaft 57 or remove the whole planting assembly.

These seed hoppers 104 and 105 are interchangeable by removing the pin 99 which pivotally secures the hoppers 104 and 105 to their supports 102 and 103.

The clutch mechanism which is mounted on the shaft 57 comprises the collar 130 which is fixedly secured on the shaft 57, against which the cam member 131 presses, said cam member being loosely mounted on the shaft 57 and being supported by the brace 60. The crank arm 69 has the lower end thereof mounted loosely on the shaft 57, the lower end being designated by the numeral 132, these members 131 and 132 having the cam faces 133 and 134 pressing against each other and loosely mounted on the shaft 57 is the sprocket wheel 153 which has the teeth 154 on one side thereof and the hollow member 135 is fixedly mounted on the shaft 57 and has peripheral teeth 156 on one end thereof which are adapted to engage the teeth 154 when the parts are in position for driving the distributors and planters. This member 135 has the pin 138 which fixedly secures the member 135 on the shaft 57 in close proximity to the member 139 which serves as a bearing for the shaft 57 and to which brace 64 is secured. On the inside of the member 135 there are the inwardly projecting ribs 140 and 141 which project into slots 142 and 143 in the inner member 144 which inner member has one end thereof fitting against the sprocket member 153 and the coiled spring 145 is loosely mounted around the shaft 57 and has one end thereof projecting into the hollow end of member 144 and the other end of the spring projects against the member 135 which insures that the members 144 and 135 and the spring 145 will move together at all times. The member 144 has the hole 146 through which air and lubrication substances may pass.

When the lever 31 is pushed forwardly the crank 69 will move forwardly, and the clutch mechanism will assume the position shown in Figure 12, and this disconnects the power take-off 50 from the shaft 57, but when the lever 31 is pulled rearwardly the clutch parts will assume the positions shown in Figure 14 and shaft 57 will be driven, thus driving the guano distributors and the planters.

In the drawings and specifications I have set forth a preferred embodiment of my invention and although specific terms are employed, they are used in a generic and descriptive sense only and not for purposes of limitation, the scope of my invention being set forth in the appended claims.

I claim:

1. In combination with a tractor, cultivating members secured on each side of the tractor, a guano distributor secured on each side of the tractor and having spouts leading to the cultivating members, seed planters secured to the tractor, furrow opening means secured to the rear of the cultivating members and adapted to receive a delivery spout from the planters, a power take-off adapted to be attached to one of the rear wheels of the tractor and having driving means leading therefrom, a shaft transversely mounted on the tractor and having a plurality of driving means thereon, a clutch mechanism mounted on said transversely disposed shaft, driving connections between the power take-off and the clutch mechanism, driving connections between the transversely disposed shaft and all of the guano distributors and planters and means for rendering the guano distributors and planters inoperative when the cultivating members are raised.

2. In combination with a tractor, cultivating members mounted on each side of the tractor, means for raising and lowering the cultivator members, planting means and guano distributors mounted on each side of the tractor, a shaft transversely disposed with relation to the tractor and having driving means thereon, separate connections between each of the driving means and the guano distributors, a power take-off secured to one of the rear wheels of the tractor, driving connections between said power take-off and the transversely disposed shaft and clutch mechanism disposed on said shaft between the driving connections over the power take-off and the said shaft connecting means between the clutch mechanism and the raising and lowering means for the cultivating members, said connections being adapted to render the transversely disposed shaft inoperative when the cultivating members are raised.

3. The combination of a tractor having cultivating implements secured thereto, guano distributing means secured on the tractor and being adapted to be driven by the tractor, spouts leading from the guano distributing means to certain of the cultivating members, planting means secured on the tractor at a point rearwardly of the cultivating members, furrow opening means associated with the cultivating members and means for delivering seed from the planting means to the furrow opening means.

4. In combination with a tractor having cultivating members secured on the sides thereof, guano distributing means and a seed planter secured on each side of the tractor and adapted to be both simultaneously and selectively driven by the progress of the tractor, a means for rendering said guano distributing means and seed planters inoperative when the cultivating members are raised.

5. In combination with a tractor having cultivating members secured on each side thereof, means for raising and lowering the cultivating members, guano distributing and seed planting means mounted on each side of the tractor, a shaft transversely disposed on the tractor, driving connections between the said shaft and the said guano distributing and seed planting means, a power take-off on one of the rear wheels, driving connections between said power take-off and a loosely mounted sprocket on the transversely disposed shaft, clutch means on the transversely disposed shaft, and means associated with the said sprocket and the lowering and raising means to cause the said transversely disposed shaft to become operative and inoperative at will.

In testimony whereof I affix my signature.

EUGENE M. COLE.